US009094074B2

(12) United States Patent
Gorokhov et al.

(10) Patent No.: US 9,094,074 B2
(45) Date of Patent: Jul. 28, 2015

(54) METHOD AND APPARATUS FOR COMMUNICATING ANTENNA PORT ASSIGNMENTS

(75) Inventors: Alexei Y. Gorokhov, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 947 days.

(21) Appl. No.: 12/825,179

(22) Filed: Jun. 28, 2010

(65) Prior Publication Data

US 2011/0158351 A1 Jun. 30, 2011

Related U.S. Application Data

(60) Provisional application No. 61/222,834, filed on Jul. 2, 2009.

(51) Int. Cl.
*H03K 9/00* (2006.01)
*H04B 7/06* (2006.01)
*H04B 7/04* (2006.01)

(52) U.S. Cl.
CPC .............. *H04B 7/063* (2013.01); *H04B 7/0417* (2013.01); *H04B 7/0684* (2013.01); *H04B 7/0691* (2013.01); *H04B 7/0452* (2013.01)

(58) Field of Classification Search
CPC .... H04L 5/0051; H04L 5/0057; H04B 7/063; H04B 7/0691; H04B 7/0417; H04B 7/0684; H04B 7/0452

USPC .......... 370/311, 329, 330, 343; 455/450, 509; 375/260

See application file for complete search history.

(56) References Cited

U.S. PATENT DOCUMENTS

| | | | |
|---|---|---|---|
| 8,270,359 B2 * | 9/2012 | Nangia et al. ................. | 370/329 |
| 2008/0212701 A1 * | 9/2008 | Pan et al. ...................... | 375/260 |
| 2010/0272032 A1 * | 10/2010 | Sayana et al. ................ | 370/329 |
| 2011/0292903 A1 * | 12/2011 | Jongren et al. ............... | 370/329 |

FOREIGN PATENT DOCUMENTS

| WO | WO2008103317 | 8/2008 |
|---|---|---|
| WO | WO2010033869 | 3/2010 |

OTHER PUBLICATIONS

R1-091793 "Downlink control signaling for dual-layer beamforming", May 4-May 8, 2009, 3GPP TSG-RAN-WG1 Meeting#57, pp. 1-4.*
R1-091933, "Control Signaling for Enhanced DL transmission for LTE", May 4-May 8, 2009, 3GPP TSG-RAN-WG1 Meeting#57, pp. 1-10.*

(Continued)

*Primary Examiner* — Sophia Vlahos

(57) ABSTRACT

A method, an apparatus, and a computer program product for wireless communication are provided in which downlink control information (DCI) including a total number of available antenna ports, a rank indicator for a user equipment (UE), and one or more port assignment bits is received, a subset of the total number of available antenna ports that are assigned to the UE based on at least one of: the rank indicator or the one or more port assignment bits is determined, and demodulation based on reference signals corresponding to the set of assigned antenna ports is performed.

40 Claims, 10 Drawing Sheets

(56) References Cited

OTHER PUBLICATIONS

3GPP TS 36.212, "3rd Generation Partnership Project; Technical Specification Group Radio Acce Network; Evolved Universal Terrestrial Radio Access (E-UTRA); Multiplexing and channel coding", Version V8.7.0, Release 8, May 2009, pp. 1-60.*
NTT DoCoMo: "DL DM-RS Design for LTE-Advanced", 3GPP Draft; R1-092798 DL DMRS for LTE-A, 3rd Generation Partnership Project (3GPP), Mobile Competence Centre ; 650, Route Des Lucioles ; F-06921 Sophia-Antipolis Cedex ; France, no. Los Angeles, USA; Jun. 24, 2009, pp. 1-8.*
R1-091318 "On dual layer beamforming" Mar. 2009, Ericsson, 3GPP TSG-RAN WG1 #56bis, pp. 1-4.*
3rd Generation Partnership Project;Technical Specification Group Radio AccessNetwork; Evolved Universal Terrestrial Radio Access (E-UTRA); Physical Channels and Modulation (Release 8) 3GPP Standard; 3GPP TS 36.211, 3rd Generation Partnership Project (3GPP), Mobile Competence Centre ; 650, Route Des Lucioles ; F-06921 Sophia-Antipolis Cedex ; France, No. V8.7.0, May 1, 2009, pp. 1-83, XP050377539.
International Search Report and Written Opinion—PCT/US2010/040706, International Search Authority—European Patent Office—Oct. 6, 2010.
"Downlink control signaling for dual-layer beamforming", 3GPP TSG-RAN-WG1 Meeting #57bis, R1-092360, Los Angeles, USA, Jun. 29-Jul. 3, 2009.
Taiwan Search Report—TW099121932—TIPO—May 6, 2013.
3GPP TS 36.212, "3rd Generation Partnership Project; Technical Specification Group Radio Access Network; Evolved Universal Terrestrial Radio Access (E-UTRA); Multiplexing and channel coding", Version V8.7.0, Release 8, May 2009, pp. 1-60, XP050377553.
NTT DoCoMo: "DL DM-RS Design for LTE-Advanced", 3GPP Draft; R1-092798 DL DMRS for LTE-A, 3rd Generation Partnership Project (3GPP), Mobile Competence Centre ; 650, Route Des Lucioles ; F-06921 Sophia-Antipolis Cedex ; France, no. Los Angeles, USA; Jun. 24, 2009, XP050351252, [retrieved on Jun. 24, 2009].
Taiwan Search Report—TW099121932—TIPO—Aug. 16, 2014.

* cited by examiner

METHOD AND APPARATUS FOR COMMUNICATING ANTENNA PORT ASSIGNMENTS

CROSS-REFERENCE TO RELATED APPLICATION(S)

This application claims the benefit of U.S. Provisional Application Ser. No. 61/222,834, entitled "Method and Apparatus to Enable Interpretation of a LVRB/DVRB Flag for UE-RS Offset Indication" and filed on Jul. 2, 2009, the contents of which are hereby incorporated by reference herein in their entirety.

BACKGROUND

1. Field

The present disclosure relates generally to communication systems, and more particularly, to methods and systems for antenna port assignment communication.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with communication of antenna port assignments. The method can comprise receiving downlink control information (DCI) including a total number of available antenna ports, the rank indicator for a user equipment (UE), and one or more port assignment bits. Further, the method can comprise determining a subset of the total number of available antenna ports that are assigned to the UE based on at least one of: a rank or the one or more port assignment bits. Moreover, the method can comprise performing demodulation based on reference signals corresponding to the set of assigned antenna ports.

Still another aspect relates to a computer program product comprising a computer-readable medium. The computer-readable medium can include code for receiving downlink control information (DCI) including a total number of available antenna ports, a rank indicator for a UE, and one or more port assignment bits. Further, the computer-readable medium can include code for determining a subset of the total number of available antenna ports that are assigned to the UE based on at least one of: the rank indicator or the one or more port assignment bits. Moreover, the computer-readable medium can include code for performing demodulation based on reference signals corresponding to the set of assigned antenna ports.

Yet another aspect relates to an apparatus. The apparatus can include means for receiving DCI including a total number of available antenna ports, a rank indicator for a UE, and one or more port assignment bits. Further, the apparatus can comprise means for determining a subset of the total number of available antenna ports that are assigned to the UE based on at least one of: the rank indicator or the one or more port assignment bits. Moreover, the apparatus can comprise means for performing demodulation based on reference signals corresponding to the set of assigned antenna ports.

Another aspect relates to an apparatus for wireless communications. The apparatus can include processing system configured to receive DCI including a total number of available antenna ports, a rank indicator for a UE, and one or more port assignment bits, determine a subset of the total number of available antenna ports that are assigned to the UE based on at least one of: the rank indicator or the one or more port assignment bits, and perform demodulation based on reference signals corresponding to the set of assigned antenna ports.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 1:
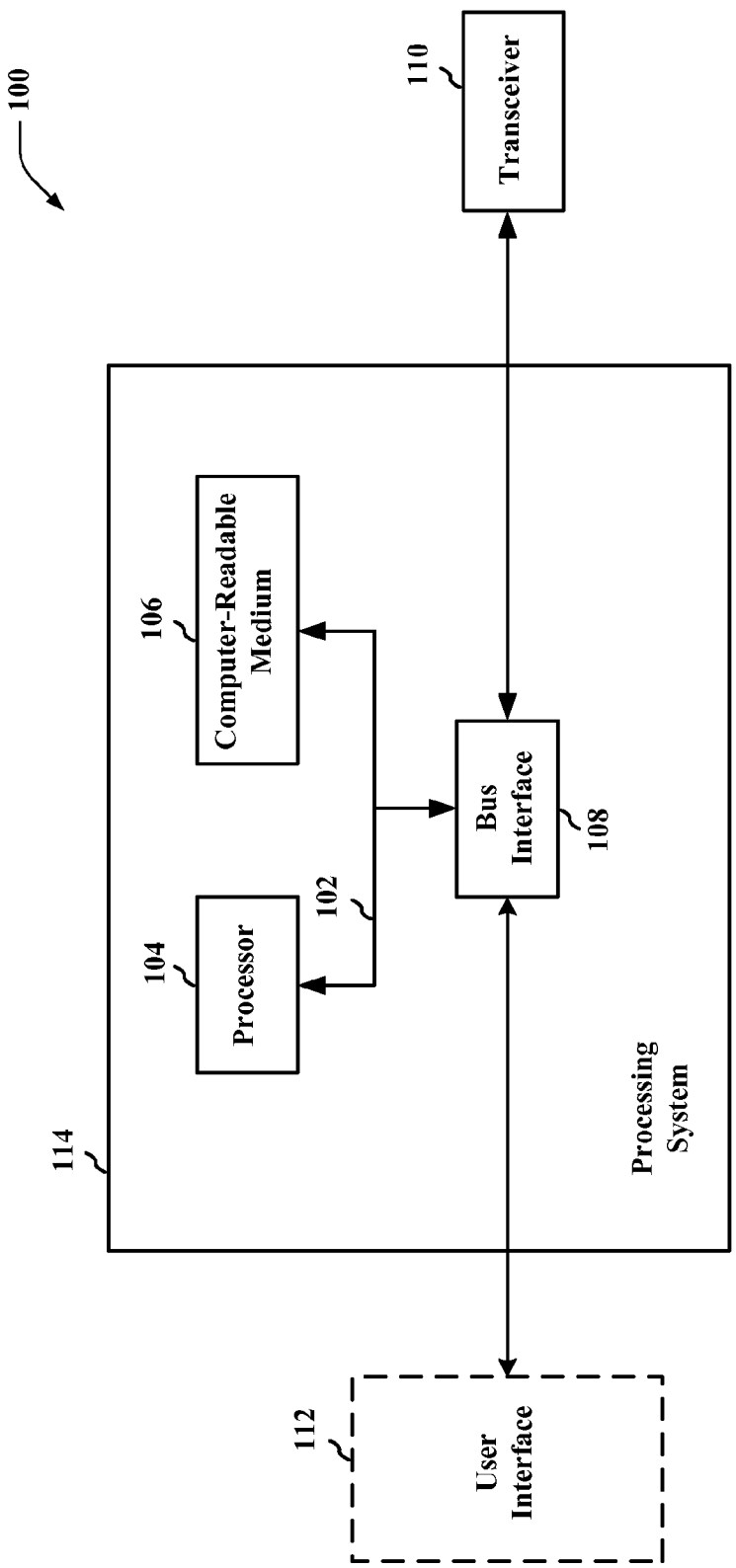
FIG. 1 is a diagram illustrating an example of a hardware implementation for an apparatus employing a processing system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
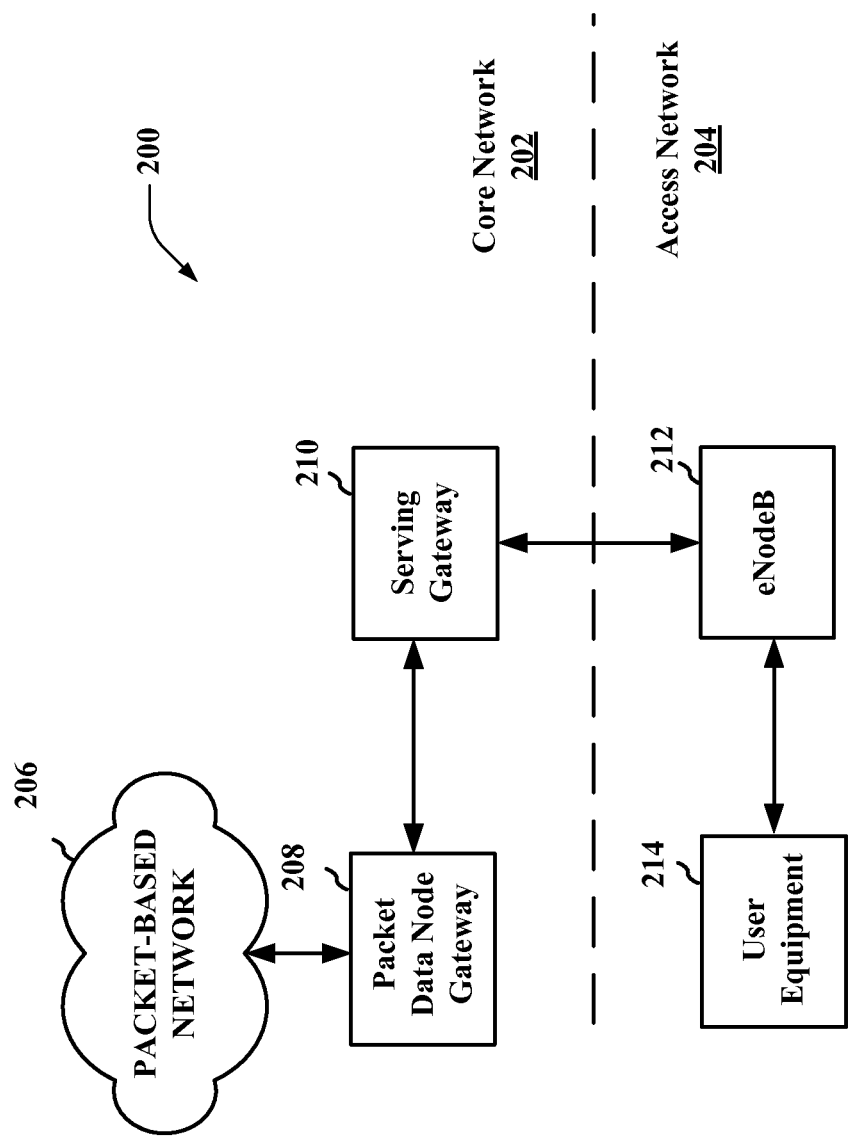
FIG. 2 is a diagram illustrating an example of a network architecture.

An example of a telecommunications system employing various apparatus will now be presented with reference to an LTE network architecture as shown in FIG. 2. The LTE network architecture 200 is shown with a core network 202 and an access network 204. In this example, the core network 202 provides packet-switched services to the access network 204, however, as those skilled in the art will readily appreciate, the various concepts presented throughout this disclosure may be extended to core networks providing circuit-switched services.

The access network 204 is shown with a single apparatus 212, which is commonly referred to as an eNodeB in LTE applications, but may also be referred to by those skilled in the art as a base station, a base transceiver station, a radio base station, a radio transceiver, a transceiver function, a basic service set (BSS), an extended service set (ESS), or some other suitable terminology. The eNodeB 212 provides an access point to the core network 202 for a mobile apparatus 214. Examples of a mobile apparatus include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The mobile apparatus 214 is commonly referred to as UE in LTE applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The core network 202 is shown with several apparatus including a packet data node (PDN) gateway 208 and a serving gateway 210. The PDN gateway 208 provides a connection for the access network 204 to a packet-based network 206. In this example, the packet-based network 206 is the Internet, but the concepts presented throughout this disclosure are not limited to Internet applications. The primary function of the PDN gateway 208 is to provide the user equipment (UE) 214 with network connectivity. Data packets are transferred between the PDN gateway 208 and the UE 214 through the serving gateway 210, which serves as the local mobility anchor as the UE 214 roams through the access network 204.

Figure 3:
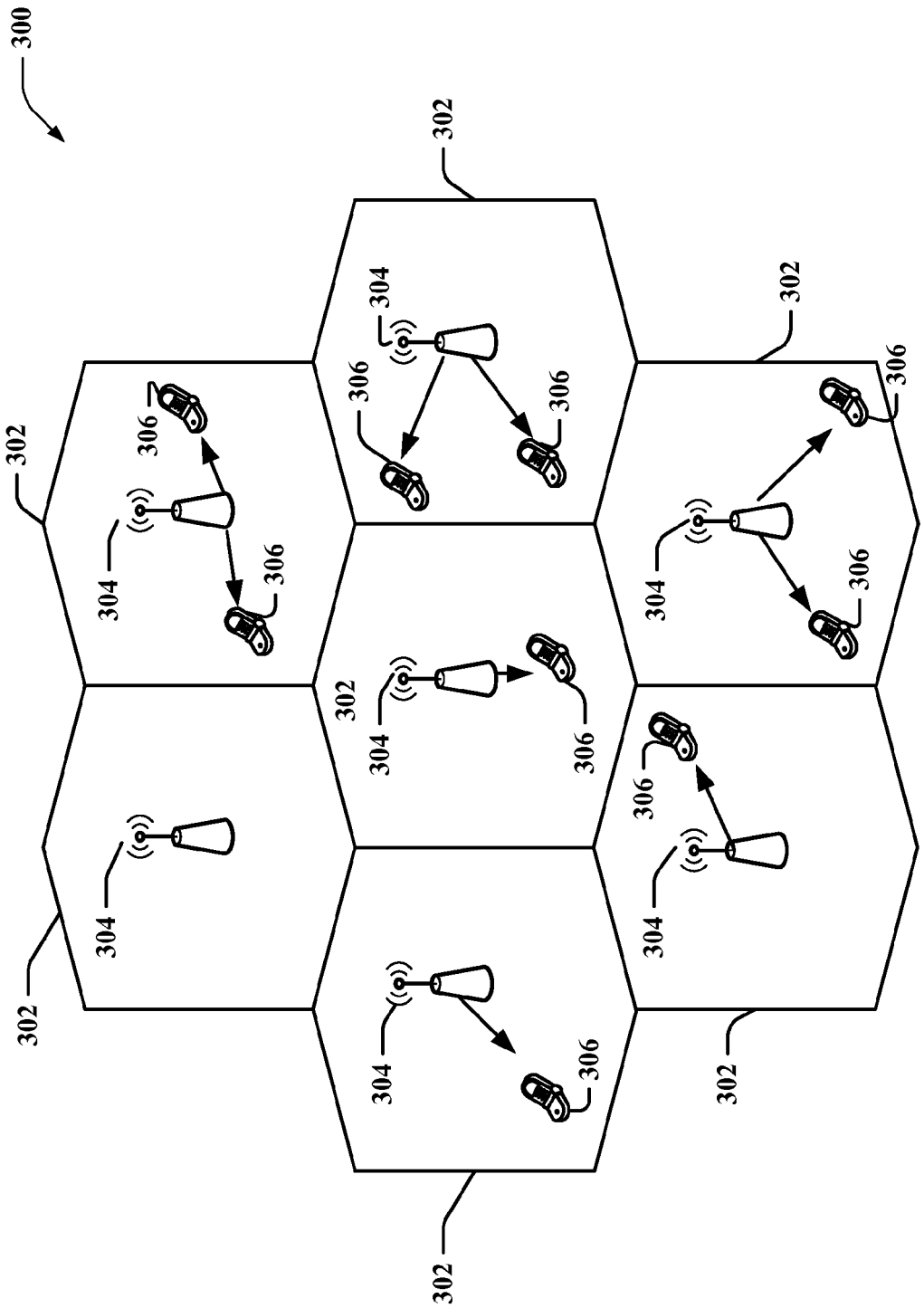
FIG. 3 is a diagram illustrating an example of an access network.

An example of an access network in an LTE network architecture will now be presented with reference to FIG. 3. In this example, the access network 300 is divided into a number of cellular regions (cells) 302. An eNodeB 304 is assigned to a cell 302 and is configured to provide an access point to a core network 202 (see FIG. 2) for all the UEs 306 in the cell 302. There is no centralized controller in this example of an access network 300, but a centralized controller may be used in alternative configurations. The eNodeB 304 is responsible for all radio related functions including radio bearer control, admission control, mobility control, scheduling, security, and connectivity to the serving gateway 210 in the core network 202 (see FIG. 2).

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeB 304 may have multiple antennas supporting MIMO technology. The use of MIMO technology enables the eNodeB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enable each of the UE(s) 306 to recover the one or more data streams destined for that UE 306. On the uplink, each UE 306 transmits a spatially precoded data stream, which enables the eNodeB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
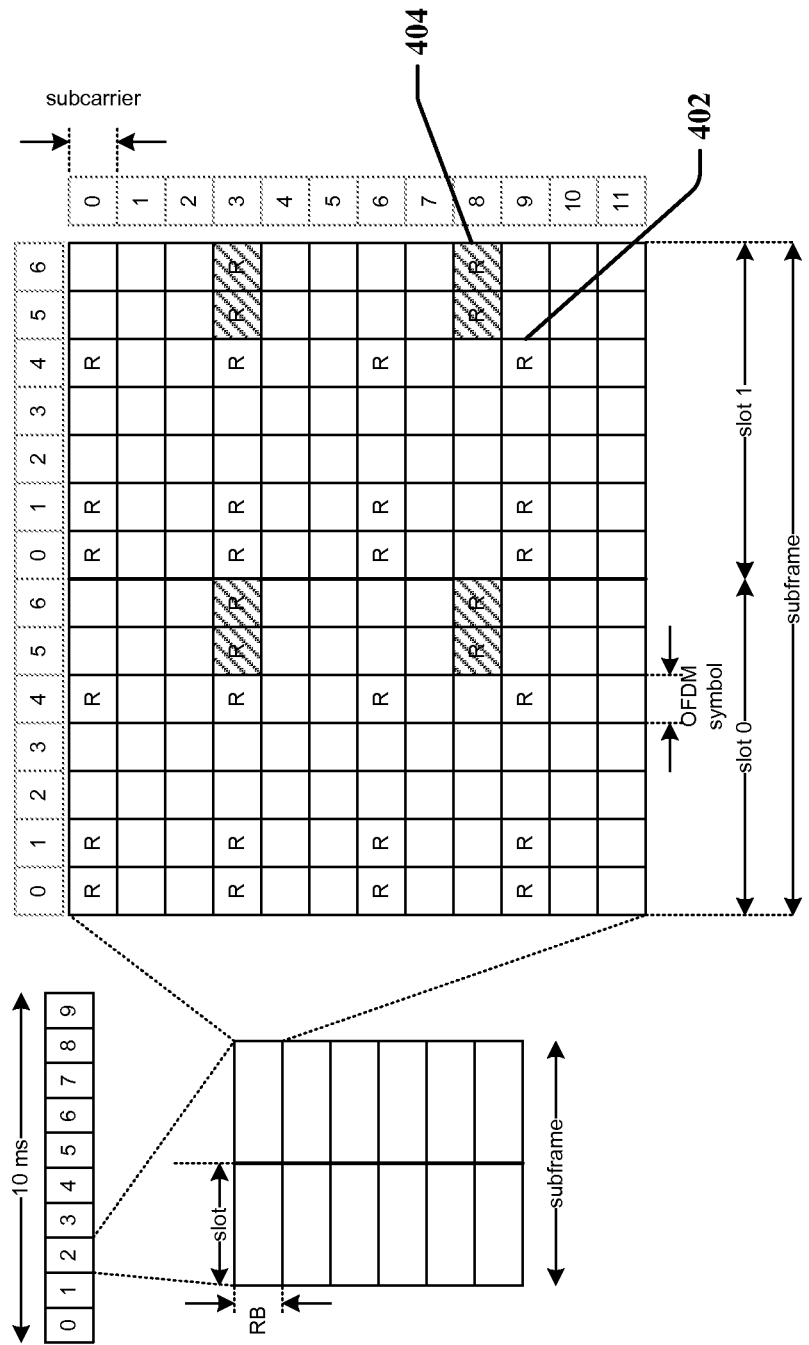
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each two time slots including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include a DL reference signal (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
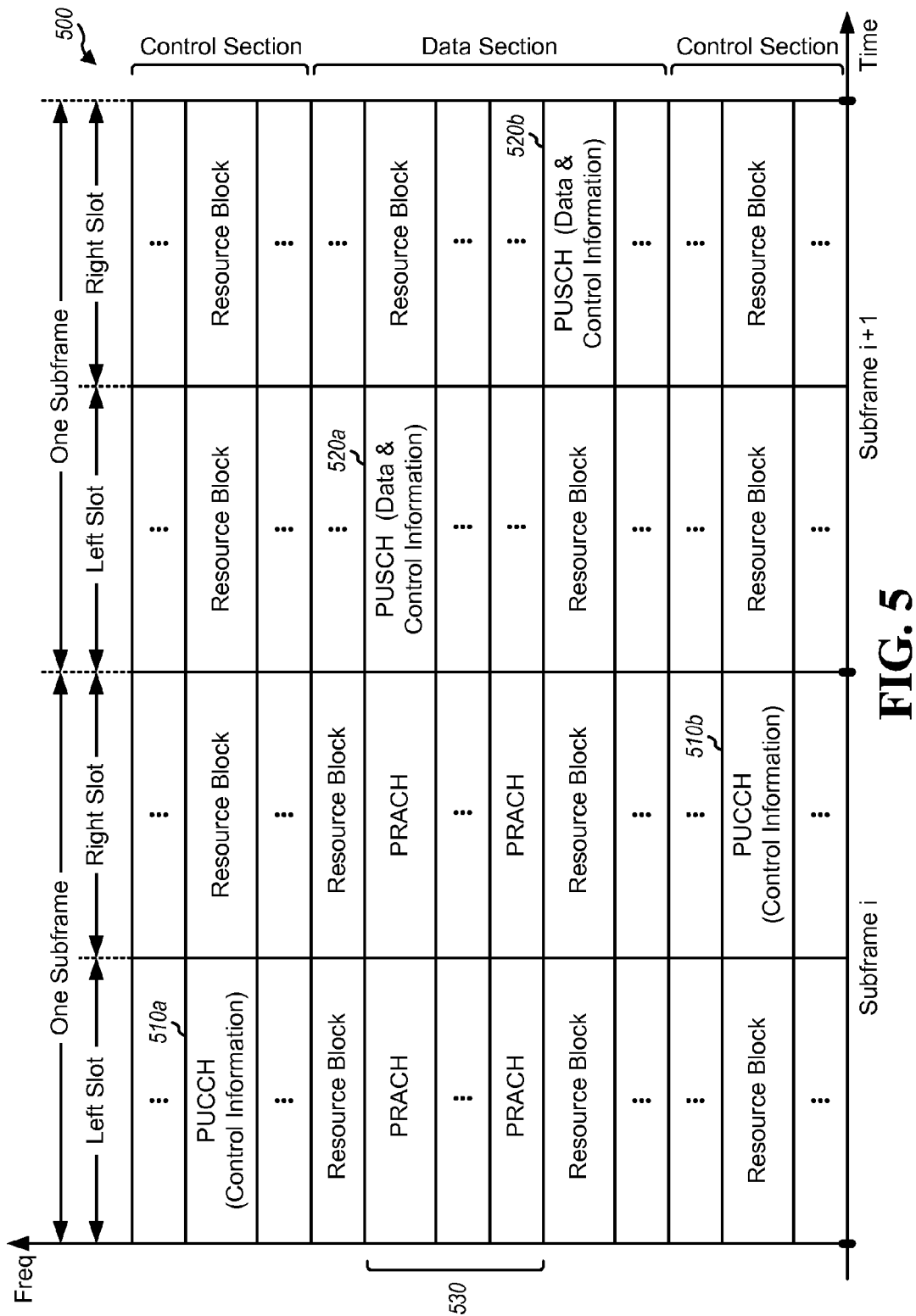
FIG. 5 shows an exemplary format for the UL in LTE.

An example of an UL frame structure will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNodeB. The UE may also be assigned resource blocks 520a, 520b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section.

An UL transmission may span both slots of a subframe and may hop across frequency as shown in FIG. 5.

As shown in FIG. 5, a set of resource blocks may be used to perform initial system access and achieve UL synchronization in a physical random access channel (PRACH). The PRACH carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
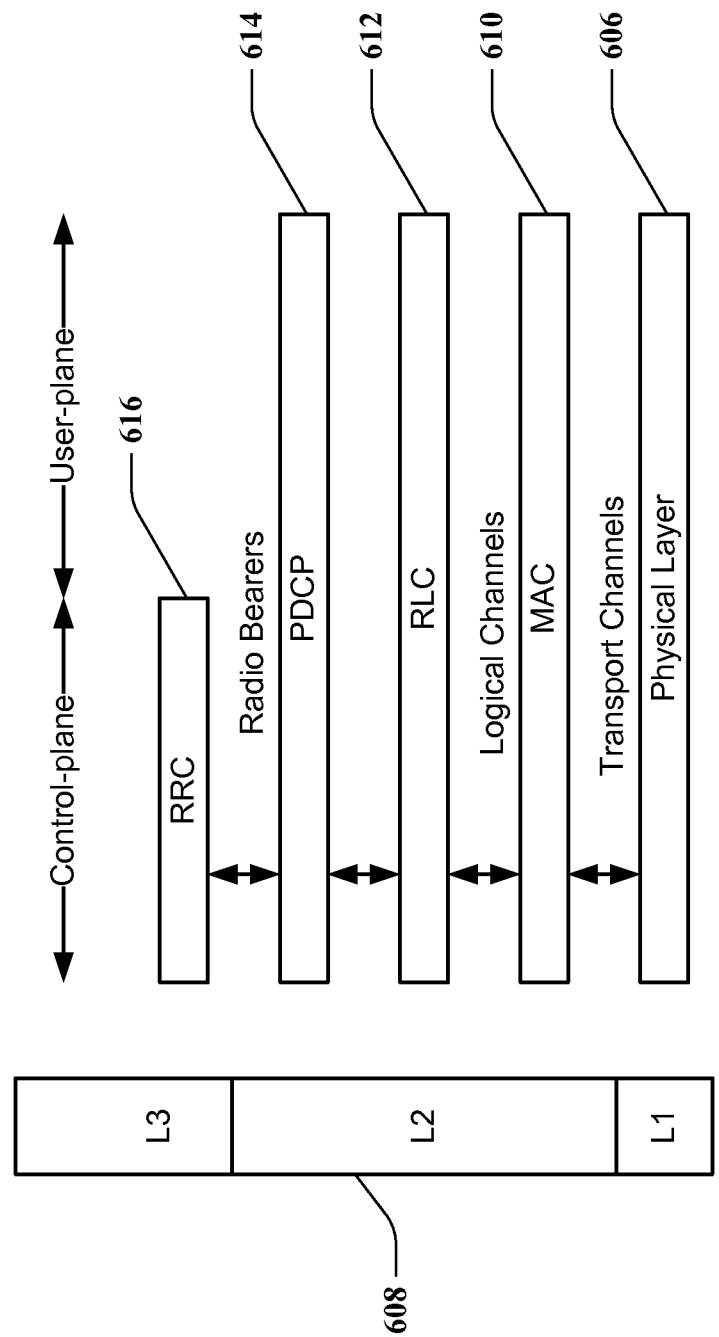
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNodeB is shown with three layers: Layer 1, Layer 2, and Layer 3. Layer 1 is the lowest layer and implements various physical layer signal processing functions. Layer 1 will be referred to herein as the physical layer 606. Layer 2 (L2 layer) 608 is above the physical layer 606 and is responsible for the link between the UE and eNodeB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNodeB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNodeBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNodeB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNodeB and the UE.

Figure 7:
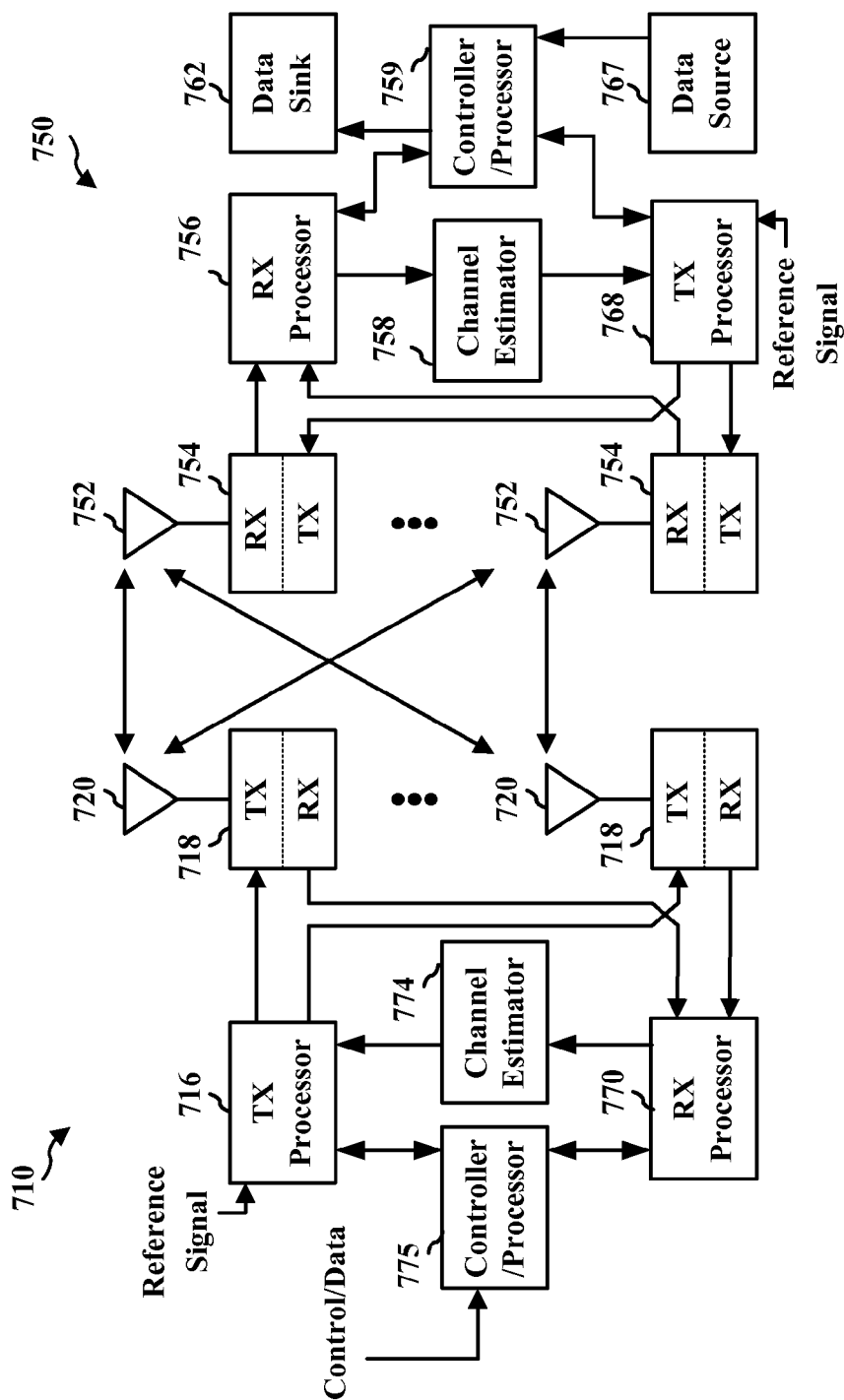
FIG. 7 is a diagram illustrating an example of an evolved NodeB (eNodeB) and UE in an access network.

FIG. 7 is a block diagram of an eNodeB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNodeB 710. These soft decisions may be based on channel estimates computed by the channel estimator 758. The soft decisions are then decoded and deinterleaved to recover the data and control signals that were originally transmitted by the eNodeB 710 on the physical channel. The data and control signals are then provided to the controller/processor 759.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer. Similar to the functionality described in connection with the DL transmission by the eNodeB 710, the controller/processor 759 implements the L2 layer for the user plane and the control plane by providing header compression, ciphering, packet segmentation and reordering, and multiplexing between logical and transport channels based on radio resource allocations by the eNodeB 710. The controller/processor 759 is also responsible for HARQ operations, retransmission of lost packets, and signaling to the eNodeB 710.

Channel estimates derived by a channel estimator 758 from a reference signal or feedback transmitted by the eNodeB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNodeB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the controller/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an ACK and/or NACK protocol to support HARQ operations.

The processing system 100 described in relation to FIG. 1 includes the UE 750. In particular, the processing system 100 includes the TX processor 768, the RX processor 756, and the controller/processor 759.

Figure 8:
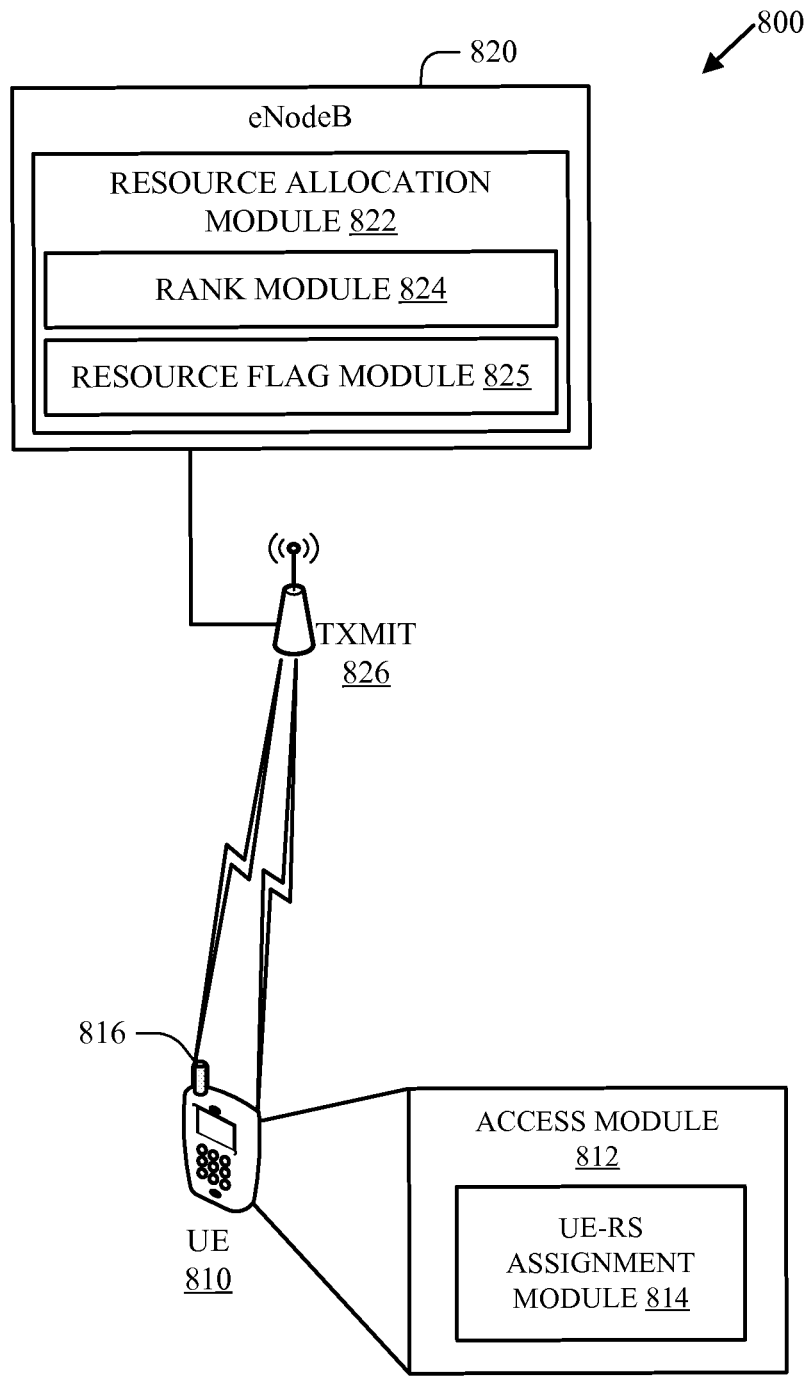
FIG. 8 is a block diagram of a system for facilitating antenna port allocation according to an aspect.

With reference now to FIG. 8, a block diagram of a system 800 for facilitating antenna port allocation for communications in a wireless communication system is illustrated. System 800 may include one or more eNodeBs 820 and one or more UEs 810 (e.g., wireless communications devices (WCD)), which can communicate via respective antennas 826 and 816. In one aspect, eNodeB 820 may function as an access network (AN). In one aspect, eNodeB 820 may conduct a downlink (DL) communication to UE 810 via antennas 826. Further, eNodeB 820 may include resource allocation module 822, which may include rank module 824 and resource flag module 825. In one aspect, resource allocation module 822 may configure UE 810 for various transmission modes, such as but not limited to, single antenna port, transmit diversity, open-loop special multiplexing, closed-loop special multiplexing, multi-user MIMO (MU-MIMO), closed loop rank equals 1 precoding, port five single antenna port, etc. In one aspect, such configurations may be made semi-statically. Further, resource allocation module 822 may indicate which of multiple available antenna ports may be used for communication with UE 810. In one aspect, rank module 824 may include a rank indication (RI). In one aspect, a RI may indicate a number of layers (antenna ports, UE-RSs, etc.) available for transmissions. Still further, resource flag module 825 may include one or more flags (e.g., bits) into DL communications to UE 810 to further indicate with UE-RSs may be assigned for communications.

At the UE 810, the DL communications may be received by access module 812 via antennas 816. In one aspect, DL communications may be accompanied with a physical downlink control channel (PDCCH). In one such aspect, the DL communications may be explicitly accompanied by the PDCCH through dynamically scheduling. In another aspect, DL communications may be implicitly accompanied by the PDCCH through semi-persistently scheduled, non-adaptive DL transmissions, etc. Further, PDCCH may carry downlink control information (DCI). In one aspect, DCI may be communicated using various formats. For example, in an LTE system, format 1A may be used for compact signaling of resource assignments for single codeword PDSCH transmissions, and for allocating a dedicated preamble signature to a UE. Further, various elements may be included in a DCI format 1A, such as, a flag to differentiate between format 0 and format 1A, a flag to indicate whether a localized or distributed virtual resource block (LVRB/DVRB) mapping mode may be used, a resource block assignment, HARQ information, and power control command for uplink control information. Further, in a LTE system, each of formats 1A, 1B and 1D include the LVRB/DVRB flag to indicate whether localized or distributed VRB may be used for the assignment or not. In such an aspect, a localized VRB assignment may indicate resources used by PDSCH are contiguous in frequency domain, and do not hop within a subframe. In another aspect, a distributed assignment may indicate resources may be non-contiguous in frequency and may hop between the two slots in a subframe.

Further, UE 810 may include UE-RS assignment module 814 operable to determine which antenna ports have been assigned to the UE 810. In a system in which hopping is not present, the LVRB/DVRB flag may be available for other uses, such as to indicate antenna port usage for various UE-RSs. For example, in LTE release 8, hopping may be present, while in LTE release 9, hopping is not present. Further, in LTE release 9, dual-layer beamforming may be supported. In such a configuration, in order to support MU-MIMO, UE-RS assignment module 814 may use an additional element to indicate which UE-RS may be used for each UE in a paired MU-MIMO operation. In one aspect, the additional element may be the LVRB/DVRB flag. In another aspect, where only two possible antenna ports may be assigned in a MU-MIMO, a single bit may be sufficient for UE-RS assignment module 814 to indicate which antenna port is assigned. For example, in LTE release 9, antenna ports 7 and 8 may be assigned for MU-MIMO use. Such antenna ports may be referred to as UE-RS0 and UE-RS1, respectively. In still another aspect, where more than two antenna ports may be assigned for MU-MIMO, multiple bits may be used by UE-RS assignment module 814 to indicate which antenna ports are assigned. In one aspect, the multiple bits may include the LVRB/DVRB flag and a $TB_{swap}$ flag. Further, additional information such as a RI and UE-RS offset may be used to indicate to the UE 810 which UE-RSs are assigned to this UE. For example, an offset value of 0 and a rank of 2 may indicate UE-RSs 0 and 1 are assigned to the UE 810, while an offset value of 1 and a rank of 2 may indicate UE-RSs 2 and 3 are assigned to the UE 810.

In one aspect, UE 810 may be configured for various DL transmission modes. Each DL transmission mode may be associated with two DCI formats, one of which may be DCI format 1A, and the other DCI format may depend on the specified transmission mode. A table of various transmission modes and their respective DCI formats is provided with reference to Table 1.

TABLE 1

Reference DCI Formats for various Transmission Modes

| Transmission Mode | Reference DCI Format |
|---|---|
| 1 | 1, 1A, 1C |
| 2 | 1, 1A, 1C |
| 3 | 1A, 2A |
| 4 | 1A, 2 |
| 5 | 1A, 1D |
| 6 | 1A, 1B |
| 7 | 1, 1A |

Further, in one aspect, antenna ports may be orthogonal in time and/or frequency and/or code space. In one aspect, UE 810 may have 15 antenna ports. In one such example, antenna ports 0 to 3 may be used to communicate CRS information, port 4 to communicate evolved multimedia broadcast multicast service (eMBMS) information, port 5 to communicate a LTE release 8 UE-RS (e.g., DRS), port 6 to communicate a positioning RS, and ports 7 to 14 to communicate UE-RS0 through UE-RS7.

In another aspect, UE 810 may conduct an uplink (UL) communication to eNodeB 820 via antennas 816 using information determined by access module 812. At the eNodeB 820, the UL communication may be received via one or more of antennas 826.

Figure 9:
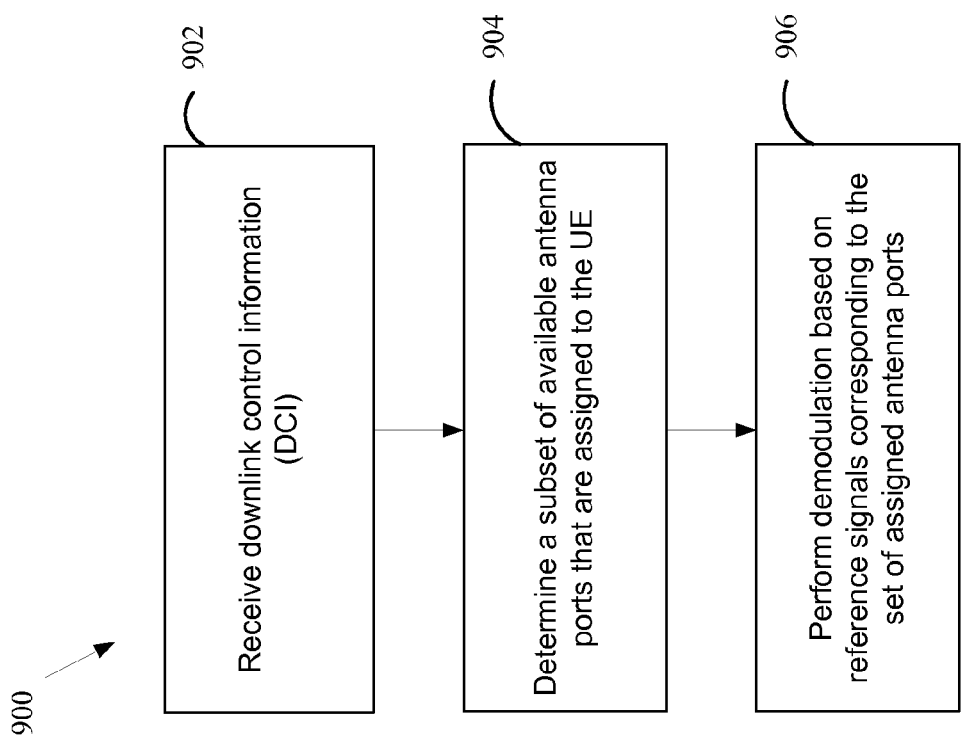
FIG. 9 is a flow chart of a method of wireless communication.

FIG. 9 illustrates various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 is a flow chart 900 of a method of wireless communication. The method includes receiving DCI (902). In one aspect, the DCI may include a total number of available antenna ports, a rank indicator for a UE, and one or more port assignment bits. In one aspect, one of the one or more port assignment bits may include a local virtual resource block/distributed virtual resource block (LVRB/DVRB) flag. In one aspect, the total number of available antenna ports may be two antenna ports, the rank indicator may be one, the one or more port assignment bits is a single bit, and as such a subset of antenna ports assigned to the UE may be determined based on a single bit. In one such aspect, the single bit is a LVRB/DVRB flag. In another aspect, the total number of available antenna ports may be greater than two, and as such, a mapping scheme may be used to determine which of the total number of available antenna ports is assigned to the UE. In yet another aspect, the antenna ports are UE-RSs. In another aspect, the DCI may be received using a PDCCH. In another aspect, the DCI may be received in at least one of: a format 1A, format 1B or format 1D. In another aspect, the received DCI may include a plurality of DCI, wherein the plurality of DCI may be received in at least one of: format 1, format 1A, format 1B, format 1D, or format 2, depending on a transmission mode for the UE.

In addition, the method includes determining a subset of the total number of available antenna ports (904). In one aspect, the antenna ports may be assigned to the UE based on at least one of: the rank or the one or more port assignment bits. In another aspect, the subset determination may be based only on the rank when the rank indicator is greater than a value. In such an aspect, the UE may assume that no other UEs are multiplexed with it and as such may assign antenna ports based on rank alone. In one example, the subset determination may be limited to rank values not greater than four. In still another aspect, when the rank is less than or equal to the value, the subset determination may be accomplished through analyzing one or more port assignment bits. In one aspect, a port assignment bit may indicate an UE-RS offset. For example, an offset value of 0 and a rank of 2 may indicate UE-RSs 0 and 1 are assigned to the UE, while an offset value of 1 and a rank of 2 may indicate UE-RSs 2 and 3 are assigned to the UE.

Furthermore, the method includes performing demodulation based on reference signals corresponding to the set of assigned antenna ports (906). In one aspect, UE-RS ports may be orthogonal in time and/or frequency and/or code space.

Figure 10:
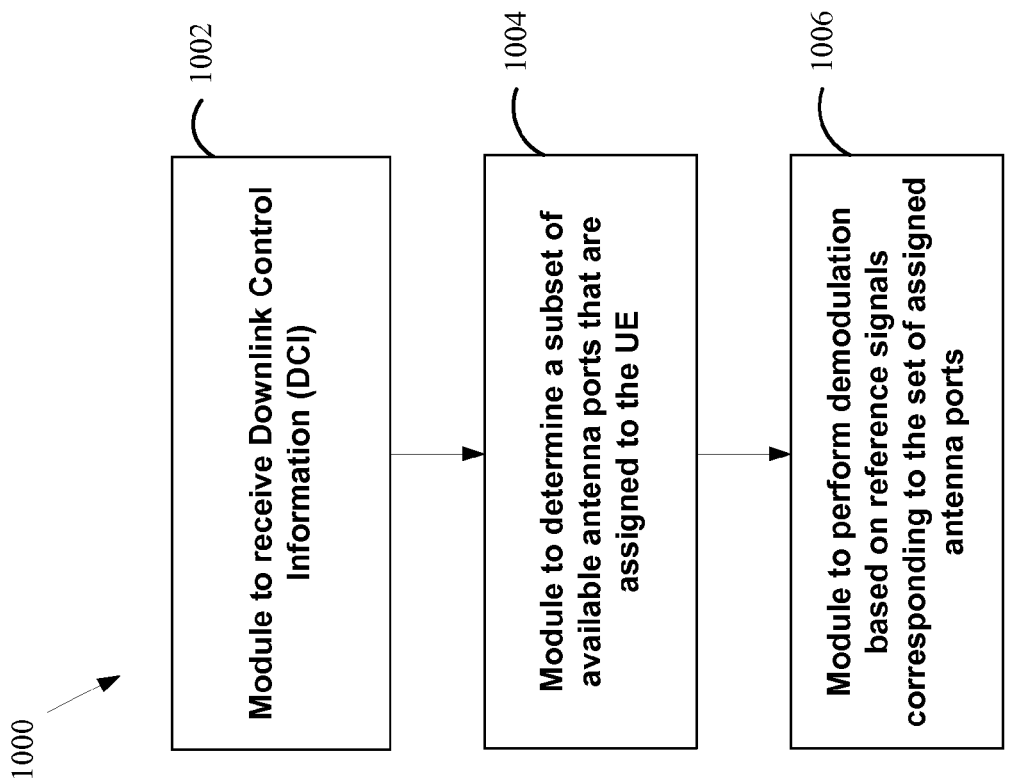
FIG. 10 is a conceptual block diagram illustrating the functionality of an exemplary apparatus.

FIG. 10 is a conceptual block diagram 1000 illustrating the functionality of an exemplary apparatus 100. The apparatus 100 includes a module 1002 that receives DCI including a total number of available antenna ports, a rank indicator for a UE, and one or more port assignment bits, a module 1004 that determines a subset of the total number of available antenna ports that are assigned to the UE based on at least one of: the rank indicator or the one or more port assignment bits, and a module 1006 that performs demodulation based on reference signals corresponding to the set of assigned antenna ports.

In one configuration, the apparatus 100 for wireless communication includes means for receiving DCI including a total number of available antenna ports, a rank indicator for a UE, and one or more port assignment bits, means for determining a subset of the total number of available antenna ports that are assigned to the UE based on at least one of: the rank or the one or more port assignment bits and means for performing demodulation based on reference signals corresponding to the set of assigned antenna ports. In addition, the apparatus 100 includes means for determining the subset based only on the rank when the rank indicator is greater than a value. In one aspect, the value is equal to four. In addition, the apparatus 100 includes means for modifying reception through orthogonalization in at least one of: time, frequency, or code space. In addition, the apparatus 100 includes means for determining that the rank is less than or equal to a value, and means for using the one or more port assignment bits to determine which of the total number of available antenna ports are assigned to the UE. In addition, the apparatus 100 includes means for mapping the UE to one or the other of the available antenna ports depending on the single bit value. In addition, the apparatus 100 includes means for using at least two port assignment bits. In such an aspect, the at least two port assignment bits and the rank may be used to determine which of the total number of available antenna ports are assigned to the UE by applying a mapping scheme. In addition, the apparatus 100 includes means for demodulating data received using a PDSCH. In addition, the apparatus 100 includes means for receiving a plurality of DCI. In such an aspect, the plurality of DCI may be received in format 1A and at least one of: format 1, format 1A, format 1B, format 1D, or format 2, depending on a transmission mode for the UE. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving downlink control information (DCI) including a rank indicator (RI) for a user equipment (UE) and one or more port assignment bits;
   determining a subset of a total number of available antenna ports that are assigned to the UE based on at least one of: the RI or the one or more port assignment bits, wherein determining the subset comprises:
   determining that the RI is less than or equal to a value; and
   using the one or more port assignment bits to determine which of the total number of available antenna ports are assigned to the UE; and
   performing demodulation based on reference signals associated with the subset of assigned antenna ports.

2. The method of claim 1, wherein one of the one or more port assignment bits comprises a local virtual resource block/distributed virtual resource block (LVRB/DVRB) flag.

3. The method of claim 1, wherein performing demodulation further comprises modifying reception through orthogonalization in at least one of: time, frequency, or code space.

4. The method of claim 1, wherein the total number of available antenna ports is two antenna ports, wherein the RI is one, wherein the one or more port assignment bits is a single bit, and wherein determining the subset further comprises mapping the UE to one or the other of the available antenna ports depending on the single bit value.

5. The method of claim 4, wherein the single bit is a local virtual resource block/distributed virtual resource block (LVRB/DVRB) flag.

6. The method of claim 1, wherein the total number of available antenna ports is greater than two, and wherein using the one or more port assignment bits comprises using at least two port assignment bits, and wherein the at least two port assignment bits and the RI are used to determine which of the total number of available antenna ports are assigned to the UE by applying a mapping scheme.

7. The method of claim 1, wherein the antenna ports are associated with UE specific reference signals (UE-RSs).

8. The method of claim 1, wherein the DCI is received using a physical downlink control channel (PDCCH), and wherein performing demodulation further comprises demodulating data received using a physical downlink shared channel (PDSCH).

9. The method of claim 1, wherein the DCI is received in at least one of: a format 1A, format 1B or format 1D.

10. The method of claim 1, wherein receiving the DCI further comprises receiving a plurality of DCI, wherein the plurality of DCI are received in at least one of: format 1, format 1A, format 1B, format 1D, or format 2, depending on a transmission mode for the UE.

11. An apparatus for wireless communication, comprising:
    means for receiving downlink control information (DCI) including a rank indicator (RI) for a user equipment (UE) and one or more port assignment bits;
    means for determining a subset of a total number of available antenna ports that are assigned to the UE based on at least one of: the RI or the one or more port assignment bits, wherein the means for determining the subset comprises:
    means for determining that the RI is less than or equal to a value; and
    means for using the one or more port assignment bits to determine which of the total number of available antenna ports are assigned to the UE; and
    means for performing demodulation based on reference signals associated with the subset of assigned antenna ports.

12. The apparatus of claim 11, wherein one of the one or more port assignment bits comprises a local virtual resource block/distributed virtual resource block (LVRB/DVRB) flag.

13. The apparatus of claim 11, wherein the means for performing demodulation further comprises means for modifying reception through orthogonalization in at least one of: time, frequency, or code space.

14. The apparatus of claim 11, wherein the total number of available antenna ports is two antenna ports, wherein the RI is one, wherein the one or more port assignment bits is a single bit, and wherein the means for determining the subset further comprises means for mapping the UE to one or the other of the available antenna ports depending on the single bit value.

15. The apparatus of claim 14, wherein the single bit is a local virtual resource block/distributed virtual resource block (LVRB/DVRB) flag.

16. The apparatus of claim 11, wherein the total number of available antenna ports is greater than two, and wherein the means for using the one or more port assignment bits comprises means for using at least two port assignment bits, and wherein the at least two port assignment bits and the RI are used to determine which of the total number of available antenna ports are assigned to the UE by applying a mapping scheme.

17. The apparatus of claim 11, wherein the antenna ports are associated with UE specific reference signals (UE-RSs).

18. The apparatus of claim 11, wherein the DCI is received using a physical downlink control channel (PDCCH), and wherein the means for performing demodulation further comprises means for demodulating data received using a physical downlink shared channel (PDSCH).

19. The apparatus of claim 11, wherein the DCI is received in at least one of: a format 1A, format 1B or format 1D.

20. The apparatus of claim 11, wherein the means for receiving the DCI further comprises means for receiving a plurality of DCI, wherein the plurality of DCI are received in at least one of: format 1, format 1A, format 1B, format 1D, or format 2, depending on a transmission mode for the UE.

21. A computer program product, comprising:
a non-transitory computer-readable medium comprising code, that when executed by a processor causes the processor to perform:
receiving downlink control information (DCI) including a rank indicator (RI) for a user equipment (UE) and one or more port assignment bits;
determining a subset of a total number of available antenna ports that are assigned to the UE based on at least one of: the RI or the one or more port assignment bits, wherein determining the subset comprises:
determining that the RI is less than or equal to a value; and
using the one or more port assignment bits to determine which of the total number of available antenna ports are assigned to the UE; and
performing demodulation based on reference signals associated with the subset of assigned antenna ports.

22. The computer program product of claim 21, wherein one of the one or more port assignment bits comprises a local virtual resource block/distributed virtual resource block (LVRB/DVRB) flag.

23. The computer program product of claim 21, wherein the non-transitory computer-readable medium further comprises code, that when executed by a processor causes the processor to perform modifying reception through orthogonalization in at least one of: time, frequency, or code space.

24. The computer program product of claim 21, wherein the total number of available antenna ports is two antenna ports, wherein the RI is one, wherein the one or more port assignment bits is a single bit, and wherein the non-transitory computer-readable medium further comprises code, that when executed by a processor causes the processor to perform mapping the UE to one or the other of the available antenna ports depending on the single bit value.

25. The computer program product of claim 24, wherein the single bit is a local virtual resource block/distributed virtual resource block (LVRB/DVRB) flag.

26. The computer program product of claim 21, wherein the total number of available antenna ports is greater than two, and wherein the non-transitory computer-readable medium further comprises code, that when executed by a processor causes the processor to perform using at least two port assignment bits, and wherein the at least two port assignment bits and the RI are used to determine which of the total number of available antenna ports are assigned to the UE by applying a mapping scheme.

27. The computer program product of claim 21, wherein the antenna ports are associated with UE specific reference signals (UE-RSs).

28. The computer program product of claim 21, wherein the DCI is received using a physical downlink control channel (PDCCH), and wherein the non-transitory computer-readable medium further comprises code, that when executed by a processor causes the processor to perform demodulating data received using a physical downlink shared channel (PDSCH).

29. The computer program product of claim 21, wherein the DCI is received in at least one of: a format 1A, format 1B or format 1D.

30. The computer program product of claim 21, wherein receiving the DCI further comprises receiving a plurality of DCI, wherein the plurality of DCI are received in at least one of: format 1, format 1A, format 1B, format 1D, or format 2, depending on a transmission mode for the UE.

31. An apparatus for wireless communication, comprising:
at least one processor configured to:
receive downlink control information (DCI) including a rank indicator (RI) for a user equipment (UE) and one or more port assignment bits;
determine a subset of a total number of available antenna ports that are assigned to the UE based on at least one of: the RI or the one or more port assignment bits, wherein determining the subset comprises:
determining that the RI is less than or equal to a value; and
using the one or more port assignment bits to determine which of the total number of available antenna ports are assigned to the UE; and
perform demodulation based on reference signals associated with the subset of assigned antenna ports.

32. The apparatus of claim 31, wherein one of the one or more port assignment bits comprises a local virtual resource block/distributed virtual resource block (LVRB/DVRB) flag.

33. The apparatus of claim 31, wherein the at least one processor is further configured to modify reception through orthogonalization in at least one of: time, frequency, or code space.

34. The apparatus of claim 31, wherein the total number of available antenna ports is two antenna ports, wherein the RI is one, wherein the one or more port assignment bits is a single bit, and wherein the at least one processor is further configured to map the UE to one or the other of the available antenna ports depending on the single bit value.

35. The apparatus of claim 34, wherein the single bit is a local virtual resource block/distributed virtual resource block (LVRB/DVRB) flag.

36. The apparatus of claim 31, wherein the total number of available antenna ports is greater than two, wherein the at least one processor is further configured to use at least two port assignment bits, and wherein the at least two port assignment bits and the RI are used to determine which of the total number of available antenna ports are assigned to the UE by applying a mapping scheme.

37. The apparatus of claim 31, wherein the antenna ports are associated with UE specific reference signals (UE-RSs).

38. The apparatus of claim 31, wherein the DCI is received using a physical downlink control channel (PDCCH), and wherein the at least one processor is further configured to demodulate data received using a physical downlink shared channel (PDSCH).

39. The apparatus of claim 31, wherein the DCI is received in at least one of: a format 1A, format 1B or format 1D.

40. The apparatus of claim 31, wherein the at least one processor is further configured to receive a plurality of DCI, wherein the plurality of DCI are received in at least one of:

format 1, format 1A, format 1B, format 1D, or format 2, depending on a transmission mode for the UE.

* * * * *